(12) United States Patent
Dodd

(10) Patent No.: US 8,831,401 B2
(45) Date of Patent: Sep. 9, 2014

(54) MANAGEMENT OF TELEVISION RECORDINGS

(75) Inventor: Kevin Dodd, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 794 days.

(21) Appl. No.: 12/488,885

(22) Filed: Jun. 22, 2009

(65) Prior Publication Data

US 2010/0034509 A1    Feb. 11, 2010

(30) Foreign Application Priority Data

Aug. 8, 2008 (GB) .................................. 0814574.0

(51) Int. Cl.
*H04N 9/80* (2006.01)

(52) U.S. Cl.
USPC ............................................................ 386/241

(58) Field of Classification Search
CPC ... G06K 9/00711; G11B 27/034; H04N 5/76; H04N 5/781
USPC ........................................................ 386/241
See application file for complete search history.

(56) References Cited

U.S. PATENT DOCUMENTS

| | | | |
|---|---|---|---|
| 6,061,471 A | 5/2000 | Coleman, Jr. | |
| 2003/0063798 A1 | 4/2003 | Li et al. | |
| 2004/0091235 A1 | 5/2004 | Gutta | |
| 2008/0134251 A1* | 6/2008 | Blinnikka | 725/58 |
| 2008/0253746 A1* | 10/2008 | Wood | 386/124 |

FOREIGN PATENT DOCUMENTS

| | | |
|---|---|---|
| EP | 1138151 | 10/2000 |
| WO | WO 01/28240 A1 | 4/2001 |
| WO | WO 2005/076279 A1 | 8/2005 |
| WO | WO 2008/002309 A2 | 1/2008 |

OTHER PUBLICATIONS

Office Action issued Feb. 10, 2012 in GB application Serial No. GB0814574.0.

* cited by examiner

*Primary Examiner* — Huy T Nguyen

(74) *Attorney, Agent, or Firm* — Oblon, Spivak, McClelland, Maier & Neustadt, L.L.P.

(57) ABSTRACT

In a television recording apparatus having a storage unit capable of storing recordings of television signals, during reproduction of a recording, an analysis of the reproduced television signal is performed to detect a credits sequence of a program. Responsive to input of a command to cease reproduction before the end of a recording, in the event that the command is input after the detected credits sequence, then the recording is deleted or there is displayed a graphical interface providing for user input to indicate a desire for deletion of the recording or not.

21 Claims, 2 Drawing Sheets

MANAGEMENT OF TELEVISION RECORDINGS

CROSS-REFERENCE TO RELATED APPLICATIONS

This application is based upon and claims the benefit of priority from British Application No. 0814574.0 filed 8 Aug. 2008, the entire contents of which are incorporated by reference.

BACKGROUND OF THE INVENTION (1) Field of the Invention

The present invention relates to digital television and in particular to the management of recordings of television signals stored on storage unit of a television recording apparatus.

(2) Description of Related Art

Various types of television recording apparatus capable of storing recordings of television signals are known, for example in which the storage unit is a high capacity storage media such as a hard disk drive. Inevitably the storage capacity of the storage unit is limited, and so the stored recordings must be managed to retain sufficient storage capacity for new recordings. Typically, the deletion of unwanted recordings is performed by the user controlling the apparatus, for example using a graphical interface providing for selection and deletion of recordings on a recording list of the stored recordings. Such management of the recordings can be inconvenient to the user, particularly as the number of recordings increases with improvements in the technology of the storage unit leading to increased capacity.

WO-2008/002309 discloses a television recording apparatus having an operation which assists the user in managing the storage of television recordings. In particular, responsive to input of a command to cease reproduction after a predetermined portion of a recording, for example 90%, the apparatus outputs a signal for display of a graphical interface providing for user input to indicate a desire for deletion of the recording or not. The apparatus accepts such user input, and, responsive to user input indicating a desire for deletion of the recording, deletes the recording.

On the premise that a user is likely to want to delete a program which has been watched in its entirety, this operation allows the user to delete watched programs in an easy manner, that is simply by providing input in response to the graphical interface. The assumption is made that a program has been watched in its entirety when the predetermined portion of the recording has been reproduced. However, this assumption is not necessarily correct, because for a given program may occupy less than the predetermined portion of the recording, for example due to a program being recorded with additional unwanted programming at the end as a safety margin. This limits the effectiveness of the operation. Depending on the predetermined portion used, the graphical interface may be displayed when a program has not been fully watched or may fail to be displayed when a program has actually been fully watched. It would be desirable to avoid this.

BRIEF SUMMARY OF THE INVENTION

According to an aspect of the present invention, there is provided a method of operating a television recording apparatus having a storage unit capable of storing recordings of television signals, the method comprising:

performing an analysis of the television signal of a recording to detect a credits sequence of a program;

during reproduction of a recording, responsive to input of a command to cease reproduction before the end of a recording, in the event that the command is input after a detected credits sequence, then either:

a) deleting the recording; or b) outputting a signal for display of a graphical interface providing for user input to indicate a desire for deletion of the recording or not, accepting such user input, and, responsive to user input indicating a desire for deletion of the recording, deleting the recording.

According to another aspect of the invention, there is provided a television recording apparatus implementing a similar method.

Thus the reproduced television signal of a recording is analysed to detect a credits sequence of a program, either during reproduction of the recording or at some other time such as during or after storage. In the event that a command to cease reproduction before the end of a recording is input after a detected credits sequence, either the recording is deleted or there is output a signal for display of a graphical interface providing for user input to indicate a desire for deletion of the recording or not.

In this manner, on the premise that a user is likely to want to delete a program which has been watched in its entirety, this operation allows the user to delete watched programs in an easy manner, that is simply by providing input in response to the graphical interface. By allowing deletion of watched programs without the need to manually navigate a stored list of recordings, this improves the operation of the apparatus in facilitating management of stored recordings. As this is performed when a credits sequence of a program has been detected, there is a high accuracy in detected that a program has actually been watched in its entirety.

There are numerous ways to detect the credits sequence. Typically this involves the detection of text, preferably scrolling text. Further and more detailed examples are described below.

To improve the accuracy further, the analysis of the reproduced television signal to detect a credits sequence of a program is performed during a predetermined portion at the end of a recording. This prevents erroneous detection outside the predetermined portion, for example due to an image of scrolling text which is not in fact a credits sequence.

To allow better understanding, an embodiment of the present invention will now be described by way of non-limitative example with reference to the accompanying drawings.

DETAILED DESCRIPTION OF THE INVENTION

Figure 1:
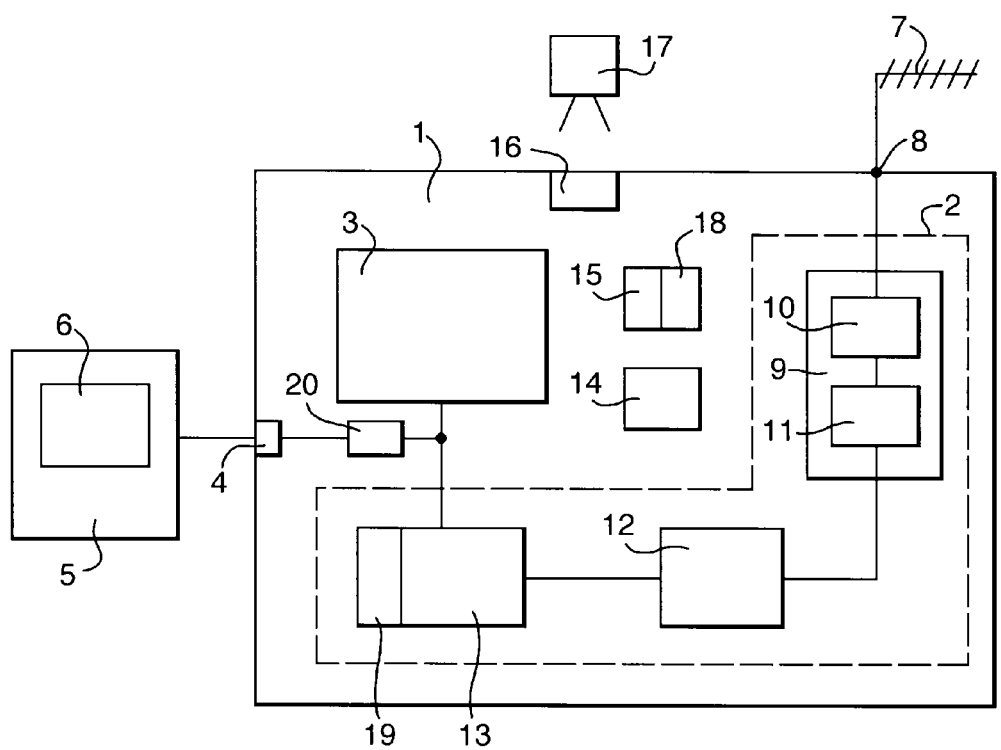
FIG. 1 is a diagram of a television recording apparatus.

FIG. 1 shows a television recording apparatus 1 comprising a receiver-decoder circuit 2 capable of receiving and decoding broadcast television signals in accordance with the DVB standards and a storage unit 3 capable of recording the decoded television signals. The decoded television signals may also be supplied to an output interface 4 for supply to a television apparatus 5 which displays an image on a display device 6. As an alternative, the display device 6 could be integrated in the recording apparatus 1.

The storage unit 3 may be of any type and capable of recording on any type of storage medium which may be integral or replaceable. Typically the storage unit 3 will be a hard drive that is integral to the apparatus or a drive for recording on an optical or magneto-optical recording medium such as a DVD.

The receiver-decoder circuit 2 is arranged to receive broadcast television signals in accordance with the DVB standard. The nature of these broadcast television signals will be now described.

According to the DVB standard, what a user might normally call a "channel" is known as a "service". For example, in the United Kingdom, BBC1 would be one service and BBC2 would be another service. Also according to the DVB standard, what a user might normally call a "program" is known as an "event". These occupy individual time slots within a service. For example, in the UK, an episode of "Newsnight" would represent one event and an episode of "University Challenge" would represent another event. Each service is therefore a concatenation of television events. Although the invention is defined using the generic term "program", this description of the recording apparatus 1 will use the term "event" to refer to programs.

According to the DVB standard, the broadcast television signal comprises a stream of packets of data multiplexed together and carried modulated onto a radio frequency (RF) carrier signal in a single RF channel. The stream is sometimes referred to as a channel because it corresponds to a transmission channel. The stream contains packets of video signal data, packets of audio signal data and packets of signalling data. Each of the data packets has a packet identifier (PID) which designates the nature of the date in the packet.

The signalling data is arranged in packets, and each packet of signalling data is associated with a particular table, the arrangement and content of which is in accordance with those defined in ISO/IEC 13818-1 and EN 300 468. Each signalling data packet has a table identifier, which designates which table the packet belongs to. Each signalling data packet also contains a "payload", which contains data about, for example, the network, the services and/or the events. The precise items of data that are stored in a packet depend on which table the packet belongs to, and details of which items of data are given in packets belonging to a particular table can be found in ISO/IEC 13818-1 and EN 300 468. For present purposes it is noted that the signalling data includes the following EPG signalling data which as described further below can be extracted for use as the content of an EPG:

a Service Description Table (SDT) which gives information on services which are being transmitted, including the names of the services; and an Event Information Table (EIT) which gives information on the events in respect of each service, including the names and times of the respective events.

The receiver-decoder circuit 2 of the recording apparatus 1 will now be described in detail. In this example, the broadcast digital television signal is a terrestrial signal transmitted on a radio frequency (RF) carrier. The recording apparatus 1 is connected to an external antenna 7 through a connector 8 in a conventional manner.

The receiver-decoder circuit 2 comprises a receiver circuit 9 to which the RF television broadcast signal received by the antenna 7 is supplied. The receiver circuit 9 comprises an RF tuner 10 which extracts the desired broadcast signal and a demodulator 11 which demodulates the broadcast signal to extract a multiplexed signal of a single broadcast channel.

As is conventional for broadcast digital television, each broadcast channel carries a multiplexed signal in which a plurality of video streams and associated audio and data streams, commonly referred to as services, are multiplexed together. The video stream extracted by the demodulator 11 is supplied to a demultiplexer 12. The demultiplexer 12 demultiplexes the packets of data in the video stream to extract one or more video signals, one or more audio signals and signalling data.

The video signal extracted by the demultiplexer 12 is supplied to a decoder 13 for decoding the video stream in accordance with a standard for example MPEG-2. The decoder 13 outputs an uncompressed video signal which is supplied to the storage unit 3 and/or the output interface 4.

As an alternative, the receiver-decoder circuit 2 may be absent from the recording apparatus 1. In this case an equivalent receiver-decoder circuit is implemented in a separate apparatus such as a set-top box, and the received, decoded televison signal is supplied to the recording apparatus 1.

The recording apparatus 1 includes a control unit 14 which controls the operation of the components of the recording apparatus 1. For example, the control unit 14 controls the receiver-decoder circuit 2 to select the broadcast video signal of a desired service.

The control unit 14 is implemented by a microprocessor running an appropriate computer program. The control unit 14 has associated therewith a RAM 15 and a non-volatile memory 18 such as a flash memory. The computer program may be stored in the storage unit 3 or the non-volatile memory 18. The computer program may be pre-installed, transferred on a computer readable storage medium or transmitted to the recording apparatus 1 as a broadcast signal, this being a known technique for upgrading of software of a television receiving equipment.

The recording apparatus 1 also has an IR (infra-red) receiver unit 16 capable of receiving signals from a remote commander 17. The remote commander 17 is operated by a user to provide user-inputs to the recording apparatus 1.

One of the functions of the control unit 14 is to generate and cause display of a graphical user interface as will now be described.

The decoder 13 includes a graphics generator 19. The control unit 14 controls the graphics generator 19 to generate a video signal representing a graphical user interface (GUI). The GUI may be superimposed on or mixed with the video signal output by the decoder 13, so that the GUI is displayed on the display device 6 of the television apparatus 5. The GUI has a cursor. In response to user-inputs generated by the remote commander 17, the control unit 14 allows the user to move the cursor to navigate around different items on the GUI and to select individual ones of the items. The GUI has a variety of screens or windows, providing different functionality. Many of the screens or windows include items which allow the user to input commands when the items are selected.

For example the GUI may include an electronic program guide (EPG) as follows.

The content of the EPG in respect of the broadcast television signals which may be received by the receiver-decoder circuit 2 is derived from the EPG signalling data output by the demultiplexer 12. The control unit 14 extracts this EPG signalling data from the signalling data packets output by the demultiplexer 12 and uses it to populate the EPG. Thus the EPG includes a list of services available for reception by the receiver-decoder circuit 2 and events in respect of those services, including the scheduled times of the events. Such content is conventional for an EPG. The control unit 14 stores data representing the EPG in the memory 15.

In response to appropriate user-input from the remote commander 17, the control unit 14 causes the GUI to display the EPG stored in the memory 15. In response to user-inputs generated by the remote commander 17, the control unit 14 allows the user to navigate the EPG and to select individual services and events.

Another of the functions of the control unit 14 is to control the recording operation of the storage unit 3. The control unit 14 accepts user-inputs indicating events in the EPG selected by the user for recording. In response to such user-inputs, the control unit 14 controls the operation of the recording apparatus 1 at the scheduled time of the event to make a recording. In particular, the control unit 14 causes the receiver-decoder circuit 2 to receive and decode the broadcast television signal and to supply the television signal from the decoder 13 to the storage unit 3. The control unit 14 causes the storage unit 3 to store the television signal as a recording.

Thus the "recording" is the data of the television signal from a start to an end point, stored on the storage unit 3. In general the recording need not have the same start and/or end point as any given event contained within it. A recording will usually include the event (or at least part of the event) selected by the user. However the recording typically will extend beyond that event due to the end point (and possibly also the start point) being set outside the scheduled timings of the event to provide a safety margin in case of the broadcast of the event being shifted from the scheduled timings.

The control unit 14 maintains a recording list of recordings on the storage unit 3. Data representing the recording list is stored in the memory 15 and/or the storage unit 3. In response to appropriate user-input from the remote commander 17, the control unit 14 causes the GUI to display the recording list. The control unit 14 accepts user-inputs indicating recordings in the recording list selected by the user for reproduction or deletion.

In response to a user-input selecting a recording for reproduction, the control unit 14 controls the operation of the recording apparatus 1 to reproduce that recording from the storage unit 3, and to supply the reproduced television signal to the output interface 4 for display on the display device 6.

In response to a user-input selecting a recording for deletion, the control unit 14 controls the operation of the recording apparatus 1 to delete that recording from the storage unit 3. In the recording apparatus 1, the deletion involves removal of the recording from the recording list so that, while the recorded data initially remains on the storage unit 3, the space is made available for a new recording in the future. The deletion of recordings could alternatively involve the recorded data being permanently erased from the storage unit 3, but that is not necessary.

The recording apparatus 1 further comprises an analysis unit 20 which performs an analysis of the recordings of television signals stored on the storage unit 3. The analysis unit 20 is illustrated functionally as a separate unit. In practice, the analysis unit 20 could be implemented by a dedicated unit or could be implemented in software running in the control unit 14 or indeed the decoder 13.

In particular, the analysis is to detect a credits sequence of an event within the reproduced television signal. There are numerous ways to achieve this as will now be discussed.

Typically the analysis will comprise the detection of text, preferably scrolling text (eg horizontally or vertically). The text may be detected by analysis of the frames of the reproduced television signal.

To detect the text, one possible technique is to use optical character recognition to detect characters. In this case, the analysis may also involve consideration of the words themselves, for example detecting the presence of predetermined words which are common in a credits sequence, such as "producer", "director" or "story by", as being indicative of a credits sequence.

Another possible technique to detect the text is to detect blocks having the shapes of words, this technique being less computationally expensive than optical character recognition, but not allowing specific words to be detected.

The detection may involve detection of text against a uniform background, on the basis that this is often the case for a credits sequence.

The detection of a credits sequence may require detection of text occurring over a sequence of the reproduced television signal of predetermined length. As a credits sequence generally lasts many seconds, this reduce the chance of erroneous detection when text which is not a credits sequence appears for a shorter period of time.

Multiple frames containing text can be compared to see if text is the same or similar, for example to detect flash type end credit screens.

Another approach is to use an artificial intelligence approach. For example, the analysis unit 20 may be a classifier system operable to classify scenes of the television signal as significant or not significant, having been trained using a reference corpus of typical examples of scenes which do and do not include credit sequences. Such a classifier system may implement any suitable artificial intelligence technique, for example a neural network. Other techniques or specific types of neural networks may be suitable for use at the classifier level in such a system. These include MLP Multilayer Perceptron, RBF Radial Basis Function, LVQ Learning Vector Quantization, SVM Support Vector Machines, SART Simplified Adaptive Resonance Theory and K-means clustering.

To improve the accuracy, the detection of a credits sequence is performed during reproduction of a predetermined portion at the end of the recording, for example in the last 25% of a recording or the last 15 minutes of a recording. This is on the basis that for most recordings a credit sequence is only likely in such a portion of the recording, so that this feature avoids detection elsewhere in the recording.

Figure 2:
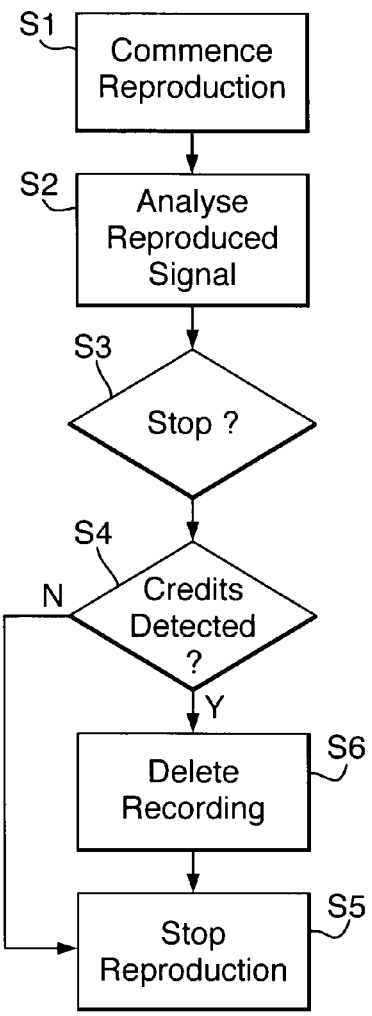
FIG. 2 is a flow chart of an operation of the television recording apparatus during reproduction of a recording.

In this embodiment, the analysis unit 20 is used during reproduction as will now be described with reference to FIG. 2 which is a flow chart of the reproduction operation of the recording apparatus 1 performed under the control of the control unit 14.

In step S1, reproduction of a selected recording is commenced. Thus the television signal of the recording is reproduced from the storage unit 3 and supplied to the output interface 4 for display on the display device 6.

In step S2, during reproduction, the reproduced television signal is analysed by the analysis unit 20 to detect a credits sequence of an event.

In step S3, the control unit 14 determines whether a command to stop reproduction has been input. Until this occurs, reproduction continues.

The operation proceeds to step S4 responsive to such a command to stop reproduction. In step S4, it is the control unit 14 determines whether a credit sequence has been detected in step S2 during reproduction of the recording. If not, the operation proceeds to step S5 in which reproduction of the recording is stopped. No action is taken to delete the recording on the basis that in the absence of detecting the credits sequence in step S4 the event has not been entirely viewed and so the user may wish to watch the remainder of the recording at a future date. Of course in this circumstance it is still open to the user to actively delete the recording using the recording list of the GUI as described above.

However, if it is determined in step S4 that a credit sequence has been detected in step S2 during reproduction of the recording, then the operation proceeds to step S6 wherein action is taken to delete the recording. This is on the basis that detection of the credits sequence means the event has been entirely viewed and so the user may well wish to delete the program. There are two alternative operations which may be performed in step S6.

The first alternative for step S6 is to delete the recording automatically, without any user input to seek confirmation.

Figure 3:
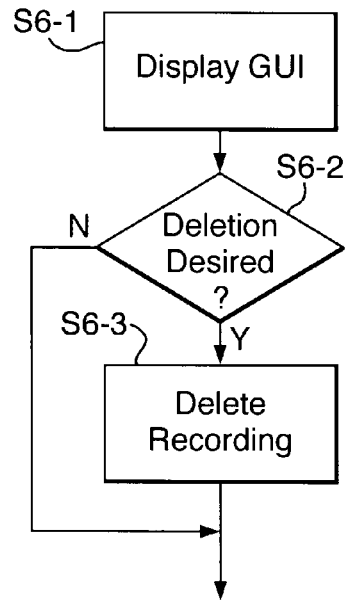
FIG. 3 is a flow chart of an alternative for a step of the operation.

The second alternative for step S6 is shown in FIG. 3 and allows the user to provide input controlling whether or not the recording is deleted, as will now be described.

In step S6-1, the control unit 14 causes a GUI to be displayed providing for user input to indicate a desire for deletion of the recording or not. An example of such a GUI is shown in FIG. 4, taking the form of a box 21 containing text asking the user whether or not deletion is desired with two buttons 22 which may be selected by the user to indicate his desire.

Figure 4:
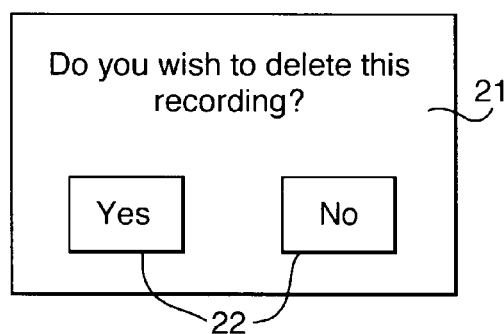
FIG. 4 is a picture of a graphical interface provided during the operation.

In step S6-2, the control unit 14 accepts the user input, for example by selection of one of the buttons 22 in FIG. 4, and determines whether this indicartes a desire for deletion. If so, the operation proceeds to step S6-3 in which the recording is deleted. If not, the operation skips step S6-3 and so the recording is not deleted.

In this manner, the user is able to choose whether to delete the recording but with a very simple operation that does not require to the user to use and navigate the recording list of the GUI as described above.

The recording apparatus 1 may exclusively perform one of the two alternatives for step S6, or may having a setting allowing the user to select which operation is performed.

Although in this embodiment the analysis unit 20 is used during reproduction to detect a credits sequence, the analysis unit 20 could be used to detect a credit sequence at some other time such as during storage of a recording or at some subsequent time. In this case, the timing of any detected credits sequence is stored and is compared with the timing of the command to determine in step S4 whether the command has been input after reproduction of the detected credits sequence.

Although the recording apparatus 1 uses signals in accordance with the DVB standard, the invention could equally be applied to alternative standards, such as the ARIB standard (for example, in Japan), or the ATSC standard (for example, in the United States).

Although the recording apparatus 1 is arranged to receive a terrestrial radio frequency television broadcast signal, it may be modified to receive any type of broadcast television signal. It may receive a satellite broadcast signal. It may receive a television signal delivered over a cable, commonly referred to as cable-TV. In this case the recording apparatus 1 has basically the same structure as shown in FIG. 1 except that the connection to the external antenna 3 is replaced by a connection to the cable. Another alternative is a television signal delivered over a network which may be a wired network such as the internet or a LAN or may be a wireless network. For example in the case of delivery over the internet, the television signals may be IPTV (Internet Protocol television). In this case the recording apparatus 1 has basically the same structure as shown in FIG. 1 except that the receiver circuit 4 is replaced by a network interface arranged to receive data from the data network and to extract a video stream therefrom.

The invention claimed is:

1. A method of operating a television recording apparatus having a storage unit capable of storing recordings of television signals, the method comprising:
    reproducing a recording including a television signal;
    performing an analysis of the television signal of the recording to detect a credits sequence of a program during a predetermined portion of the recording at the end of the recording;
    receiving a command to cease reproduction of the recording before the end of the recording;
    determining, based on the analysis, that the command to cease reproduction was received after a detected credits sequence; and
    deleting the recording automatically without any user input to seek confirmation.

2. A method according to claim 1, wherein the analysis comprises detection of text.

3. A method according to claim 2, wherein the analysis comprises detection of scrolling text.

4. A method according to claim 2, wherein the analysis comprises detection of text comprising predetermined words.

5. A method according to claim 2, wherein the analysis comprises detection of text occurring over a sequence of the reproduced television signal of predetermined length.

6. A method according to claim 2, wherein the analysis comprises detection of text against a uniform background.

7. A method according to claim 1, wherein the analysis of the television signal of a recording to detect a credits sequence of a program is performed during reproduction of the recording.

8. A method according to claim 1, wherein the television recording apparatus further comprises a receiver-decoder circuit capable of receiving and decoding the television signals.

9. A method according to claim 1, wherein the television recording apparatus further comprises a display device, the reproduced television signal and the signal for display of a graphical interface being supplied to the display device.

10. A method according to claim 1, wherein the television recording apparatus further comprises a video output interface for outputting a video signal, the reproduced television signal and the signal for display of a graphical interface being supplied to the video output interface.

11. A television recording apparatus comprising a storage unit capable of storing recordings of television signals, the television recording apparatus comprising:
    a reproduction unit arranged to reproduce a recording including a television signal;
    a control unit arranged to control the television recording apparatus,
    an analysis unit arranged to perform an analysis of the television signal of the recording to detect a credits sequence of a program during a predetermined portion of the recording at the end of the recording, and
    an input unit arranged to receive a command to cease reproduction of the recording before the end of the recording, wherein
    the control unit is arranged to
        determine, based on the analysis performed by the analysis unit, that the command to cease reproduction was received after a detected credits sequence; and
        cause the storage unit to delete the recording automatically without any user input to seek confirmation.

12. A television recording apparatus according to claim 11, wherein the analysis comprises detection of text.

13. A television recording apparatus according to claim 12, wherein the analysis comprises detection of scrolling text.

14. A television recording apparatus according to claim 12, wherein the analysis comprises detection of text comprising predetermined words.

15. A television recording apparatus according to claim 12, wherein the analysis comprises detection of text occurring over a sequence of the reproduced television signal of predetermined length.

16. A television recording apparatus according to claim 12, wherein the analysis comprises detection of text against a uniform background.

17. A television recording apparatus according to claim 11, wherein the analysis unit is arranged to perform the analysis of the television signal of a recording to detect a credits sequence of a program, during reproduction of the recording.

18. A television recording apparatus according to claim 11, wherein the television recording apparatus further comprises a receiver-decoder circuit capable of receiving and decoding the television signals.

19. A television recording apparatus according to claim 11, further comprising a display device, the television recording apparatus being arranged to supply the reproduced television signal and the signal for display of a graphical interface to the display device.

20. A television recording apparatus according to claim 11, further comprising a video output interface for outputting a video signal, the recordings display generator being arranged to supply the reproduced television signal and the signal for display of a graphical interface to the video output interface.

21. A non-transitory computer readable storage medium storing a computer program capable of execution by a television recording apparatus having a storage unit capable of storing recordings of television signals and arranged on execution to cause the television recording apparatus to perform a method comprising:

reproducing a recording including a television signal;

performing an analysis of the television signal of the recording to detect a credits sequence of a program during a predetermined portion of the recording at the end of the recording;

receiving a command to cease reproduction of the recording before the end of the recording;

determining, based on the analysis, that the command to cease reproduction was received after a detected credits sequence; and deleting the recording automatically without any user input to seek confirmation.

* * * * *